(12) United States Patent
Ryu et al.

US009692494B2

(10) Patent No.: US 9,692,494 B2
(45) Date of Patent: Jun. 27, 2017

(54) DYNAMIC SWITCHING BETWEEN WIRELESS MULTIPLE ACCESS SCHEMES

(71) Applicant: QUALCOMM Incorporated, San Diego, CA (US)

(72) Inventors: Jung Ho Ryu, Somerville, NJ (US); Sundar Subramanian, Somerville, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 14/457,748

(22) Filed: Aug. 12, 2014

(65) Prior Publication Data

US 2016/0050094 A1     Feb. 18, 2016

(51) Int. Cl.
| | |
|---|---|
| *H04L 29/06* | (2006.01) |
| *H04B 7/06* | (2006.01) |
| *H04L 27/26* | (2006.01) |
| *H04L 1/00* | (2006.01) |
| *H04L 5/00* | (2006.01) |

(52) U.S. Cl.
CPC .......... *H04B 7/0617* (2013.01); *H04B 7/068* (2013.01); *H04L 1/0001* (2013.01); *H04L 27/2636* (2013.01); *H04L 27/2646* (2013.01); *H04L 27/2697* (2013.01); *H04L 5/0007* (2013.01)

(58) Field of Classification Search
CPC ...... H04W 52/00; H04W 52/02; Y02B 60/50; Y02B 60/40
See application file for complete search history.

(56) References Cited

U.S. PATENT DOCUMENTS

| | | | |
|---|---|---|---|
| 8,509,161 B2 | 8/2013 | Imamura | |
| 2007/0168841 A1 | 7/2007 | Lakkis | |
| 2007/0291635 A1 | 12/2007 | Yang et al. | |
| 2008/0095263 A1 | 4/2008 | Xu et al. | |
| 2010/0002800 A1* | 1/2010 | Kim | H04L 5/0037 375/295 |
| 2011/0205966 A1* | 8/2011 | Iwai | H04L 1/0021 370/328 |
| 2012/0189077 A1 | 7/2012 | Seo et al. | |
| 2012/0201187 A1 | 8/2012 | Koo et al. | |

(Continued)

OTHER PUBLICATIONS

ISA/EPO, International Search Report and Written Opinion of the International Searching Authority, Int'l. App. No. PCT/US2015/040103, Oct. 5, 2015, European Patent Office, Rijswijk, NL, 11 pgs.

*Primary Examiner* — Mark Rinehart
*Assistant Examiner* — Matthew Hopkins
(74) *Attorney, Agent, or Firm* — Holland & Hart

(57) ABSTRACT

Methods, systems, and apparatuses are described for dynamic switching between wireless multiple access schemes. In some aspects, a plurality of characteristics corresponding to a respective plurality of transmit/receive beam forming direction pairs of a wireless communication channel may be identified, and a wireless multiple access schemes used for communication in the wireless communication channel may dynamically be switched based at least in part on the identified plurality of characteristics, the wireless multiple access schemes comprising orthogonal frequency division multiple access (OFDMA) and single-carrier frequency division multiple access (SC-FDMA).

29 Claims, 11 Drawing Sheets

(56) References Cited

U.S. PATENT DOCUMENTS

2013/0315321 A1    11/2013  Rajagopal et al.
2014/0092785 A1*  4/2014  Song .................... H04L 1/00
                                                      370/280
2015/0004918 A1*  1/2015  Wang ................ H04W 88/02
                                                      455/73

* cited by examiner

DYNAMIC SWITCHING BETWEEN WIRELESS MULTIPLE ACCESS SCHEMES

FIELD OF DISCLOSURE

The following relates generally to wireless communication, and more specifically to dynamic switching between wireless multiple access schemes.

DESCRIPTION OF RELATED ART

Wireless communications systems are widely deployed to provide various types of communication content such as voice, video, packet data, messaging, broadcast, and so on. These systems may be multiple access schemes capable of supporting communication with multiple users by sharing the available system resources (e.g., time, frequency, and power). Examples of such multiple access schemes include code-division multiple access (CDMA) systems, time-division multiple access (TDMA) systems, frequency-division multiple access (FDMA) systems (including single-carrier FDMA (SC-FDMA)), and orthogonal frequency-division multiple access (OFDMA) systems.

Each multiple access scheme has certain characteristics that may be used to determine in which circumstances a particular multiple access scheme should be used. For example, in some wireless communications systems that have a relatively small transmission bandwidth, OFDMA is used for downlink transmissions from a base station to a mobile device because of its relatively high throughput and resilience to poor channel conditions, such as observed echoes corresponding to reflections and refractions of a single, original transmitted signal. SC-FDMA may, however, be used for the corresponding uplink transmissions from the mobile device to the base station because of its relatively low peak to average power ratio (PAPR) characteristic. The type of multiple access scheme used for a particular link is typically fixed for these systems and does not change during operation.

SUMMARY

The described features generally relate to one or more improved systems, methods, and/or apparatuses for dynamically switching between wireless multiple access schemes in wireless communication. A transmitter and/or a receiver may identify one or more characteristics corresponding to a wireless communication channel, and may dynamically switch between two or more different wireless multiple access schemes (such as SC-FDMA and OFDMA) based on the identified characteristics. In some cases, the characteristic may be identified for a number of different transmit/receive beam forming direction pairs, and the selection of the wireless multiple access scheme may depend on a characteristic corresponding to the transmit/receive beam forming direction pair selected for the communication. The characteristic(s) identified for each transmit/receive beam forming direction pair may include one or more of a channel quality measurement, a beam width, and so forth.

A method for wireless communication is described, with the method including identifying a number of characteristics corresponding to a respective number of transmit/receive beam forming direction pairs of a wireless communication channel, and dynamically switching between wireless multiple access schemes to use for communication in the wireless communication channel based at least in part on the identified characteristics, the wireless multiple access schemes including orthogonal frequency division multiple access (OFDMA) and single-carrier frequency division multiple access (SC-FDMA).

An apparatus for wireless communication is described, with the method including means for identifying a number of characteristics corresponding to a respective number of transmit/receive beam forming direction pairs of a wireless communication channel, and means for dynamically switching between wireless multiple access schemes to use for a communication in the wireless communication channel based at least in part on the identified characteristics, the wireless multiple access schemes including orthogonal frequency division multiple access (OFDMA) and single-carrier frequency division multiple access (SC-FDMA).

Also, another apparatus for wireless communication is described, with the apparatus including a processor, a memory in electronic communication with the processor, and instructions stored in the memory. The instructions may be executable by the processor to identify a number of characteristics corresponding to a respective number of transmit/receive beam forming direction pairs of a wireless communication channel, and dynamically switch between wireless multiple access schemes to use for a communication in the wireless communication channel based at least in part on the identified characteristics, the wireless multiple access schemes including orthogonal frequency division multiple access (OFDMA) and single-carrier frequency division multiple access (SC-FDMA).

A non-transitory computer-readable medium for wireless communication in a wireless device is described. The non-transitory computer-readable medium storing computer-executable code for identifying a number of characteristics corresponding to a respective number of transmit/receive beam forming direction pairs of a wireless communication channel, and dynamically switching between wireless multiple access schemes to use for a communication in the wireless communication channel based at least in part on the identified characteristics, the wireless multiple access schemes including orthogonal frequency division multiple access (OFDMA) and single-carrier frequency division multiple access (SC-FDMA)

In some examples of the method, apparatuses, and/or computer readable medium which wireless multiple access scheme to use may be determined based at least in part on a respective characteristic corresponding to a transmit/receive beam forming direction pair of of transmit/receive beam forming direction pairs that is selected for the communication. Each respective characteristic may include a transmit or receive beam width, and a respective channel quality determination signal may be transmitted for one or more of the transmit/receive beam forming direction pairs using varying transmit and/or receive beam widths to determine which wireless multiple access scheme to use for the communication. In some examples, whether to use OFDMA or SC-FDMA for the communication may be determined based at least in part on whether the characteristic corresponding to the one transmit/receive beam forming direction pair is greater than or less than a predetermined threshold.

In some examples, a channel quality determination signal may be transmitted for each respective one of the transmit/receive beam forming direction pairs, a respective channel quality measurement corresponding to at least some of the transmit/receive beam forming direction pairs may be received, and whether to use OFDMA or SC-FDMA for the communication may be determined based at least in part on the received channel quality measurements. The channel quality determination signals may be transmitted contemporaneously using a number of different frequencies or at different times using a similar frequency. The channel quality measurement may be one or more of signal strength, signal to interference plus noise ratio (SINR), packet error rate, delay spread, or number of echoes observed at a user equipment (UE). In some examples, an indication of whether OFDMA or SC-FDMA will be used for the communication may be transmitted. Also, in some examples, the characteristics may be monitored, and the wireless multiple access scheme used may continue to dynamically switch based at least in part on the monitored characteristics.

In some examples, one or more channel quality determination signals corresponding to one or more of the transmit/receive beam forming direction pairs may be received, and a channel quality measurement corresponding to each of the one or more of the transmit/receive beam forming direction pairs may be determined, the channel quality measurement based at least in part on the respective channel quality determination signal. The determined channel quality measurements may further be transmitted. Also, the determination of whether to use OFDMA or SC-FDMA for the communication in the wireless communication channel may be based at least in part on the determined channel quality measurements.

In some examples, a channel quality determination signal may be transmitted for each of the transmit/receive beam forming direction pairs, the characteristics of the wireless communication channel may be received, with each of the characteristics including a respective channel quality measurement based at least in part on the transmitted channel quality determination signals, and a determination may be made whether to use OFDMA or SC-FDMA for the communication based at least in part on the received characteristics. In some examples, the wireless communication channel may be a millimeter wavelength radio frequency channel. Also, a transmitter may receive the characteristics and determine whether to use OFDMA or SC-FDMA for the communication in the wireless communication channel. Also, in some examples, each of the transmit/receive beam forming direction pairs includes a transmit beam forming direction relative to an orientation of a transmitter in which a beam formed signal propagates from the transmitter and also a receive beam forming direction relative to an orientation of a receiver in which the beam formed signal is received.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Features generally relating to one or more improved systems, methods, and/or apparatuses for dynamically switching between wireless multiple access schemes are described. As described in more detail below, a transmitter and/or a receiver may identify one or more characteristics corresponding to a wireless communication channel, and may dynamically switch between two or more different wireless multiple access schemes (such as SC-FDMA and OFDMA) based on the identified characteristics. In some cases, the characteristic may be identified for a number of different transmit/receive beam forming direction pairs, and the selection of the wireless multiple access scheme may depend on a characteristic corresponding to the transmit/receive beam forming direction pair selected for communication. The characteristic(s) identified for each transmit/receive beam forming direction pair may include one or more of a channel quality measurement, a beam width, and so forth Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
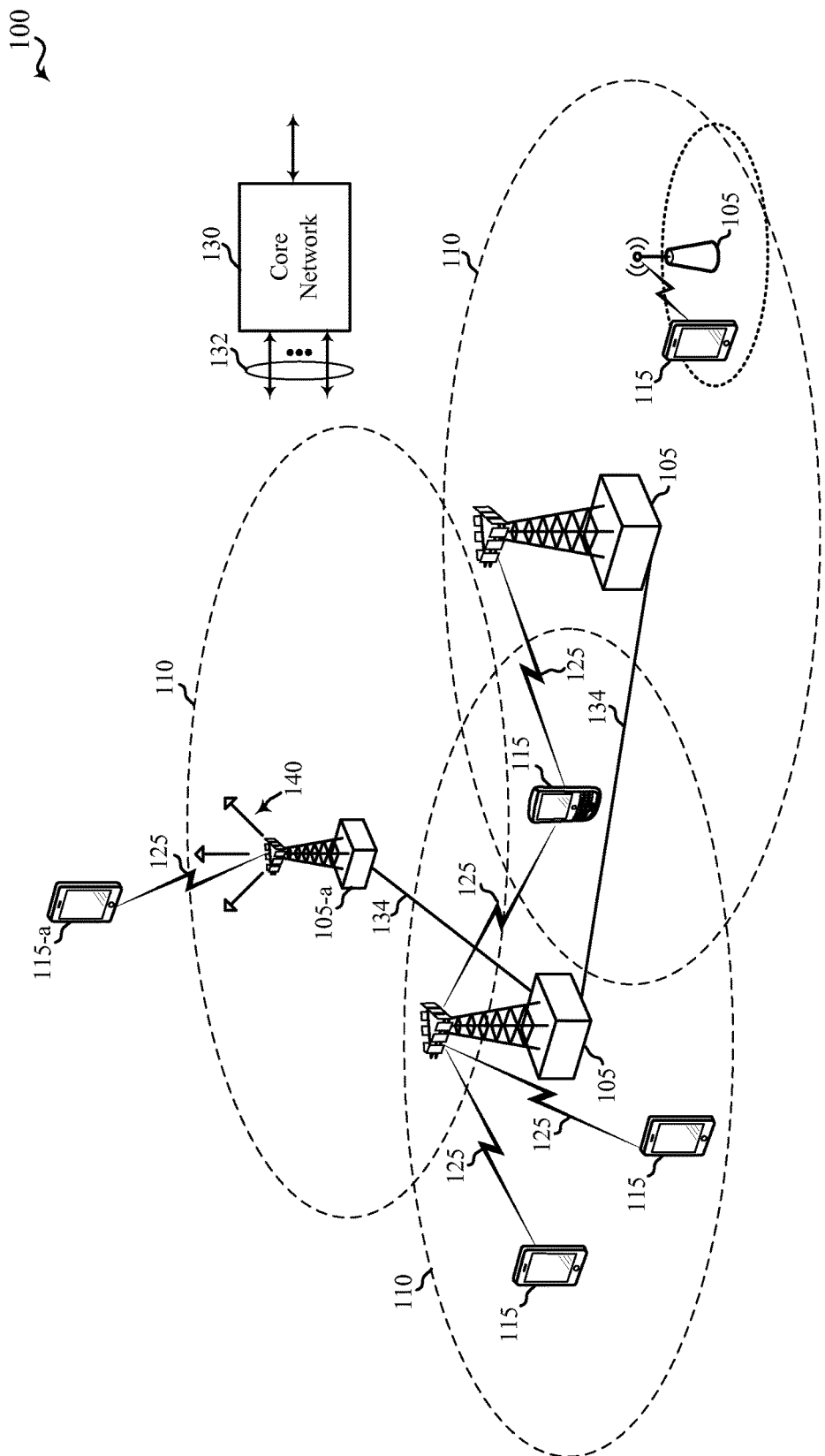
FIG. 1 shows a block diagram of a wireless communications system in accordance with aspects of the present disclosure.

FIG. 1 illustrates an example of a system 100 for dynamic switching between wireless multiple access schemes in accordance with various embodiments. The system 100 includes base stations 105, communication devices such as user equipment (UE) devices 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. In one embodiment, the base stations 105 and/or the UEs 115 may include a receiver, a switching module, and a transmitter, as described in more detail below.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

The system 100 may be a Heterogeneous Long Term Evolution (LTE)/LTE-A network in which different types of base stations 105 provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by devices with service subscriptions with the network provider. A pico cell would generally cover a relatively smaller geographic area and may allow unrestricted access by devices with service subscriptions with the network provider. A femto cell would also generally cover a relatively small geographic area (e.g., a home) and, in addition to unrestricted access, may also provide restricted access by devices having an association with the femto cell.

In some embodiments, the system 100 may be heterogeneous in that different base stations 105 may use different wireless communication technologies, and/or a single base station 105 may use a plurality of different wireless communication technologies. For example, one or more base stations 105 may use LTE technology, whereas other base stations may use 802.11n Wi-Fi technology.

The core network 130 may communicate with the base stations 105 via backhaul links 132 (e.g., S1, etc.). The base stations 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like.

The wireless communication links 125 shown in system 100 may include uplink (UL) transmissions from a UE 115 to a base station 105, in which the UE 115 acts as a transmitter and the base station 105 acts as a receiver. The wireless communication links 125 may also include downlink (DL) transmissions from a base station 105 to a UE 115, in which the base station acts as a transmitter and the UE acts as a receiver. Thus both the base stations 105 and the UEs 115 can act as both a transmitter and a receiver, depending on the direction of the data transmission. The DL transmissions may be called forward link transmissions while the UL transmissions may be called reverse link transmissions, with the DL and UL transmissions each being an example of wireless communication in a wireless communication channel.

Different radio frequency (RF) bands may be used in the system 100 of FIG. 1, each of which may have certain characteristics that make utilizing one type of wireless technology better suited for UL and/or DL transmissions than other wireless technologies. For example, the millimeter wavelength RF band (which may be 20 to 300 GHz) may have a relatively high path loss and relatively short range compared with other RF bands. In order to compensate for the path loss and short range in these millimeter wavelength RF channels, beam forming techniques may be used for the UL and/or DL transmissions, by which a transmitter uses an antenna array to transmit an RF signal in one or more particular spatial directions relative to the transmitter orientation. The transmit beam forming technique allows the RF signal to form a narrow beam(s) of energy and allows the RF signal to propagate farther in those directions. Similarly, beam forming may be used at a receiver to collect weak signals in one or more particular receive spatial directions relative to the receiver orientation. The transmit and receive beam forming techniques may reduce the root mean square (RMS) delay spread, reduce the number of observed "echoes," and so forth. Using these beam forming techniques, non-line of sight (NLOS) RF communication in, for example, the millimeter wavelength spectrum, may rely on reflection and/or diffraction of the beams to reach the UE 115. If the direction becomes blocked, either because of the UE 115 movement or changes in the environment, the beam may not be able to reach the UE 115. In some embodiments, multiple beams in multiple different directions may be made available in order to provide as good of coverage as possible.

As illustrated in FIG. 1, in the instance where a base station 105-*a* is transmitting data to a particular UE 115-*a* using beam forming, the base station transmitter may utilize one or more different beams 140 for communication (e.g., transmissions and/or receptions) with the UE 115-*a*. Each beam 140 may be associated with a transmit/receive beam forming direction pair, which may include a transmit beam forming direction and a receive beam forming direction. In some instances, the transmit/receive beam forming direction pair to use for communication may be determined using a beam search, by which multiple different transmit/receive beam forming direction pairs (and optionally different beam widths) are evaluated for their suitability for communications between the transmitter to the receiver. Each candidate beam 140 of the wireless communication channel may have one or more corresponding characteristics—such as the transmit beam forming direction, the receive beam forming direction, the beam width, a channel quality measurement (e.g., signal strength, signal to interference plus noise ratio (SINR), packet error rate, delay spread, number of observed echoes, etc.), and so forth. In some embodiments, a number of characteristics corresponding to a respective number of candidate beams 140 and their associated transmit and receive beam forming directions may be identified, and the transmitter and receiver may dynamically switch between wireless access schemes (e.g., SC-FDMA, OFDMA, etc.) to use for communication in the wireless communication channel based at least in part on the identified characteristics. The characteristics may be identified during the beam search, or separately from the beam search.

The wireless multiple access scheme may be determined based at least in part on a respective characteristic corresponding to the transmit/receive beam forming direction pair that is selected for a particular communication or set of communications. In some embodiments, the determination of which wireless multiple access scheme to use may be based at least in part on whether the characteristic corresponding to the selected transmit/receive beam forming direction pair is greater than or less than a predetermined threshold. For example, if the characteristic is transmit beam width (or receive beam width, or both transmit and receive beam widths), one wireless multiple access scheme (e.g., SC-FDMA) may be used if the beam(s) is (are) less than a predetermined threshold width, whereas another wireless multiple access scheme (e.g., OFDMA) may be used if the beam(s) is (are) greater than the predetermined threshold width. As another example, if the characteristic is channel quality, one wireless multiple access scheme (e.g., SC-FDMA) may be used if the channel quality is greater than the predetermined threshold, while another multiple access scheme (e.g., OFDMA) may be used if the channel quality is less than the predetermined threshold. In some embodiments, a combination of two or more characteristics may be used to determine which wireless multiple access scheme will be used for a particular communication.

The determination of which wireless multiple access scheme to use may be based on both the characteristic(s) of the channel and the types of wireless multiple access schemes that are available. SC-FDMA, for example, may have a relatively low peak to average power ratio (PAPR), and may generally be preferred over OFDMA, which has a higher PAPR, to achieve greater power efficiency. The PAPR difference between SC-FDMA and OFDMA may be particularly large when the communication bandwidth is relatively large, such as in the millimeter wavelength RF band. OFDMA, on the other hand, may be used, notwithstanding its higher PAPR cost, if the beam(s) is (are) wide enough and/or the channel quality is low enough, because OFDMA may be able to compensate for non-linear distortions and to address greater RMS delay spreads and/or a greater number of echoes. Thus, in one embodiment, SC-FDMA may be used if the beam width(s) is (are) smaller than the predetermined threshold and/or the channel quality is better than the predetermined threshold for a selected beam, whereas OFDMA may be used if the beam width(s) is (are) greater than the predetermined threshold and/or the channel quality is worse than the predetermined threshold.

Figure 2:
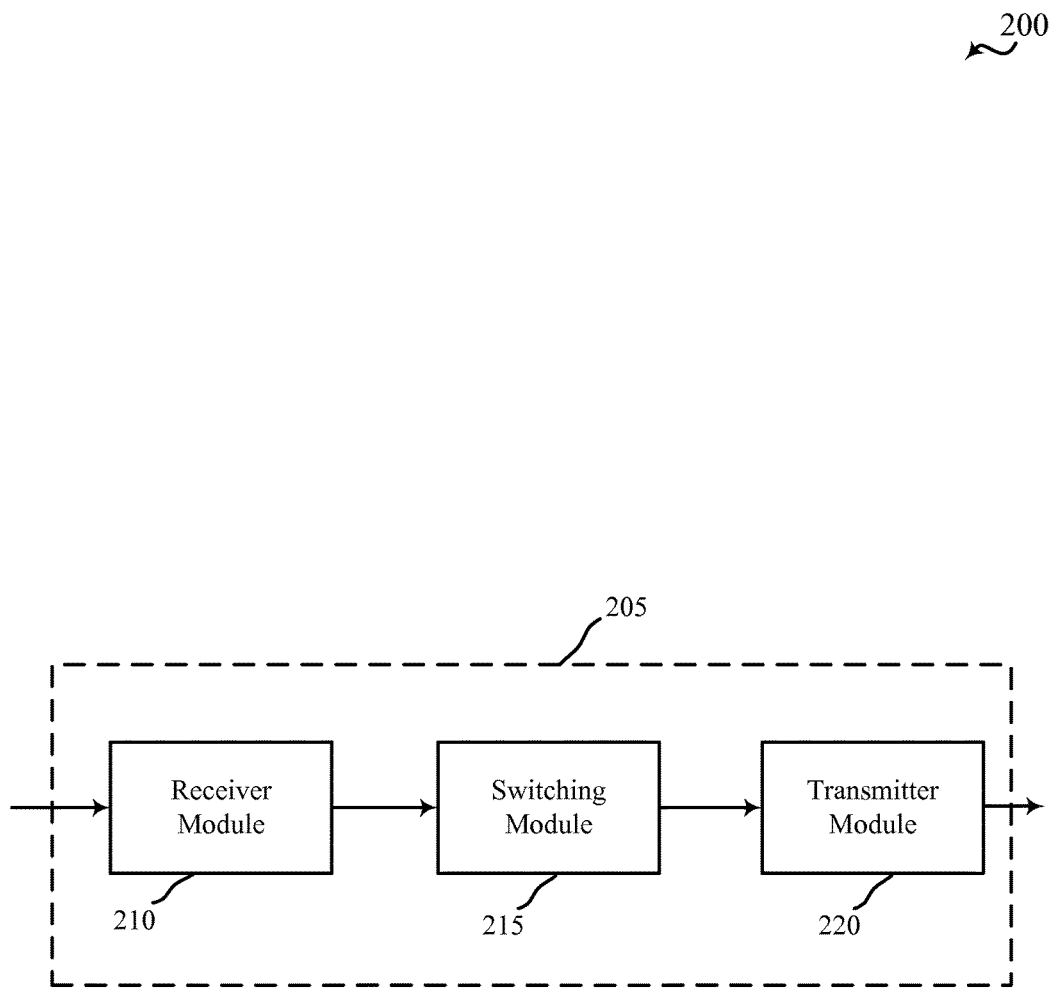
FIG. 2 shows a block diagram of an apparatus for dynamic switching between wireless multiple access schemes in accordance with aspects of the present disclosure.

FIG. 2 shows a block diagram 200 of an apparatus 205 for use in wireless communication in the system 100 of FIG. 1 in accordance with various embodiments. The apparatus 205 may be a base station 105 or a UE 115 in the system 100 of FIG. 1, and may be configured to perform the operations described above with reference to FIG. 1. The apparatus 205 shown in FIG. 2 includes a receiver module 210, a switching module 215, and a transmitter module 220. The apparatus 205 may also include a processor. Each of these components may be in communication with each other.

The components of the apparatus 205 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 210 may receive information such as packets, user data, and/or control information associated with various information channels (e.g., control channels, data channels, etc.). Received information may be passed to the switching module 215 and to other components of the apparatus 205. If the apparatus 205 is a base station 105, the receiver module 210 may receive information from the core network 130 in FIG. 1 that is to be transmitted to a UE 115. Alternatively, if the apparatus 205 is a UE 115, the receiver module 210 may receive information from a user that is to be transmitted to a base station 105 and eventually to the core network 130.

The transmitter module 220 may transmit one or more signals received from other components of the apparatus 205. In some embodiments, the transmitter module 220 may be collocated with the receiver module 210 in a transceiver module. If the apparatus 205 is a base station 105, the transmitter module 220 may transmit information received from the core network 130 in FIG. 1 to a UE 115. Alternatively, if the apparatus 205 is a UE 115, the transmitter module 220 may transmit information received from a user to a base station 105, which in turn may transmit the data to the core network 130.

The switching module 215 may be configured to identify a number of characteristics corresponding to a number of candidate beams 140 each with a respective transmit and receive beam forming direction for a wireless communication channel between either the transmitter module 220 of the apparatus 205 in FIG. 2 and a receiver module of a different apparatus, or between the transmitter module of a different apparatus and the receiver module 210 of the apparatus 205 in FIG. 2. In some embodiments, the switching module 215 may identify the characteristics by receiving the characteristics from another component of the apparatus 205 or outside of the apparatus 205, whereas in other embodiments, the switching module 215 may identify the characteristics by measuring or computing the characteristics itself. In either case, the switching module 215 may also be configured to dynamically switch between wireless multiple access schemes (e.g., SC-FDMA and OFDMA) to use for communications in the wireless communication channel based at least in part on the identified characteristics.

For a given communication in the wireless communication channel, in some embodiments, the functions of the switching module 215 may be performed by a single switching module 215 positioned in a transmitter (e.g., a base station 105 or a UE 115), by a single switching module 215 positioned in a receiver (e.g., a UE 115 or a base station 105), or by a combination of switching modules 215 positioned in both the transmitter and receiver. As one example, a transmitter, such as a base station 105, may identify the characteristics and determine whether to use OFDMA or SC-FDMA for communication in the wireless communication channel based at least on the identified characteristics. In this example, the transmitter may identify a transmit and/or receive beam width based on the beam search described above, and/or may identify a channel quality characteristic based on a channel quality measurement received from the intended receiver, as described in more detail below. As another example, a receiver, such as a UE 115, may identify the characteristics and determine whether to use OFDMA or SC-FDMA based at least in part on the identified characteristics. In this example, the receiver may identify a transmit and/or receive beam width based on information received from the transmitter, and/or may identify a channel quality characteristic based on channel quality determination signal received from the transmitter, as described in more detail below. In either example, the entity (e.g., the transmitter or the receiver) that determines which wireless multiple access scheme will be used may communicate the determination and/or the data used to make the determination to the other entity.

Referring back to the system 100 shown in FIG. 1, it will be appreciated that while both UL and DL communications are contemplated—i.e., the system 100 is a two-way communications system—in some embodiments, the functions of the switching module 215 may only be implemented for only one of UL or DL communications. More specifically, in some embodiments, the wireless multiple access scheme used for communication may dynamically change, as described above, for either UL or DL communications, but the wireless multiple access scheme used for communications of the other type may not dynamically change, and may instead be permanently or semi-permanently fixed. In other embodiments, however, the wireless multiple access scheme used for both UL and DL communications may dynamically change as described herein.

Figure 3:
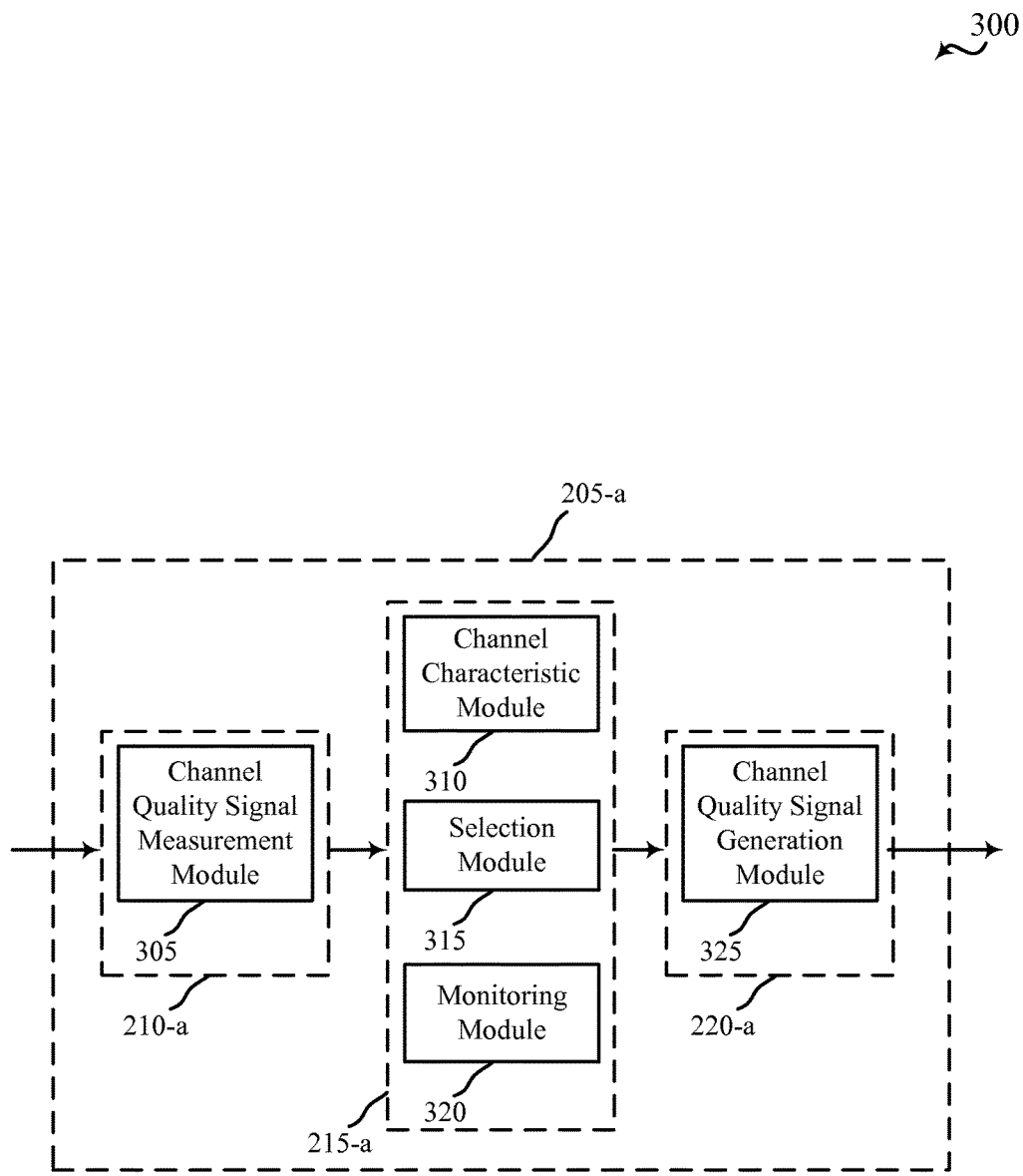
FIG. 3 shows a block diagram of an apparatus for dynamic switching between wireless multiple access schemes in accordance with aspects of the present disclosure.

FIG. 3 shows a block diagram 300 of an apparatus 205-*a* for use in wireless communication in the system 100 of FIG. 1 in accordance with various embodiments. The apparatus 205-*a* in FIG. 3 may be, for example, one of the base stations 105 or UEs 115 shown in FIG. 1. Further, the apparatus 205-*a* in FIG. 3 may be an example of one or more aspects of the apparatus 205 described with reference to FIG. 2, and may be configured to perform the operations described above with reference to FIG. 2. The apparatus 205-*a* shown in FIG. 3 includes a receiver module 210-*a*, a switching module 215-*a*, and a transmitter module 220-*a*. The apparatus 205-*a* may also include a processor. Each of these components may be in communication with each other.

As illustrated in FIG. 3, the receiver module 210-*a* may include a channel quality signal measurement module 305, and/or the transmitter module 220-*a* may include a channel quality signal generation module. Further, the switching module 215-*a* in FIG. 3 may include one or more of a channel characteristic module 310, a selection module 315, and a monitoring module 320. The receiver module 210-*a* in FIG. 3 may be an example of one or more aspects of the receiver module 210 in FIG. 2, the switching module 215-*a* in FIG. 3 may be an example of one or more aspects of the switching module 215 in FIG. 2, and/or the transmitter module 220-*a* in FIG. 3 may be an example of one or more aspects of the transmitter module 220 in FIG. 2.

The components of the apparatus 205-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The channel quality signal measurement module 305 may be configured to receive one or more channel quality determination signals corresponding to one or more transmit/receive beam forming direction pairs (each transmit/receive beam forming direction pair associated with a candidate beam 40), and to determine a channel quality measurement corresponding to each of the one or more transmit/receive beam forming direction pairs, the channel quality measurement based at least in part on the respective channel quality determination signal. The channel quality measurement may, for example, be an estimate of a channel gain in the frequency domain, etc. In some embodiments, the channel quality measurement may assume that zero-forcing or minimum mean squared error (MMSE) equalization will be used. The channel quality signal measurement module 305 may receive the channel quality determination signals transmitted by a channel quality signal generation module 325 of a transmitter that will be transmitting data to the receiver module 210-*a* (as described in more detail below). Thus in some instances, the channel quality signal measurement module 305 is only included in the receiver module 210 for apparatuses that receive communications for which the wireless multiple access scheme can dynamically change.

The channel quality measurements may include one or more of signal strength, signal to interference plus noise ratio (SINR), packet error rate, delay spread, number of echoes observed at a receiver etc.

In some embodiments, the channel quality signal measurement module 305 may transmit the determined channel quality measurements (e.g., via transmitter module 220-*a*) to, for example, a receiver module 210 in a transmitter. In some embodiments, all of the determined channel quality measurements are transmitted, whereas in other embodiments, only a subset of the determined channel quality measurements are transmitted—such as those corresponding to what is likely to be the best transmit/receive beam forming direction pair and beam width.

Referring still to FIG. 3, the channel quality signal generation module 325 may be configured to formulate and transmit one or more channel quality determination signals in a number of transmit beam forming directions to one or more receivers, optionally using one or more different beam widths for each direction. The channel quality determination signals may include, for example, a known sequence of OFDM pilot tones. These channel quality determination signals may be received by the channel quality signal measurement module 305 of a corresponding receiver, and may be used to generate respective channel quality measurements corresponding to the transmit/receive beam forming direction pairs, which in turn may be used to determine which wireless multiple access scheme will be used for communications in the wireless communication channel. In some instances, the channel quality signal generation module 325 is only included in the transmitter module 220 for apparatuses that can dynamically change the wireless multiple access scheme used for communications.

In one embodiment, the channel quality signal generation module 325 may contemporaneously transmit a channel quality determination signal in multiple transmit beam forming directions using a number of different frequencies, whereas in other embodiments, the channel quality signal generation module 325 may transmit the channel quality determination signals for different transmit beam forming directions at different times using the same frequency. Also, in some embodiments, the channel quality signal generation module 325 may be configured to transmit channel quality determination signals in one or more of the transmit beam forming directions using varying beam widths.

Turning now to the components of the switching module 215-a, the channel characteristic module 310 may be configured to receive, determine, store, and/or transmit characteristics regarding multiple candidate beams 140 for use in a communication, including transmit and/or receive beam forming directions, beam width, channel quality, and so forth.

The selection module 315 may be configured to determine whether to use OFDMA or SC-FDMA or other wireless multiple access schemes (including dynamically switching between the use of OFDMA or SC-FDMA or other wireless multiple access schemes during operation) based at least in part on a respective characteristic corresponding to a transmit/receive beam forming direction pair and optionally a beam width selected for the communication. For example, the selection module 315 may be configured to determine whether to use OFDMA or SC-FDMA or other wireless multiple access schemes based at least in part on channel quality measurements, including channel quality measurements determined by the channel quality signal measurement module 305.

In some embodiments, a transmitter for a given communication may include the selection module, and may determine whether to use OFDMA, SC-FDMA, or another scheme based at least in part on channel quality measurements transmitted to the transmitter by a channel quality signal measurement module 305 of the receiver to which the data is to be transmitted. In other embodiments, the receiver includes both a channel quality signal measurement module 305 and a selection module 315, and thus the receiver may determine whether to use OFDMA, SC-FDMA, or another scheme based at least in part on the channel quality measurements, and transmit the determination to the transmitter. In still other embodiments, the selection module 315 may determine which wireless multiple access scheme to use for communications based on a beam width characteristic, or a combination of the beam width characteristic and a channel quality measurement. As mentioned above, the selection module 315 may use one or more thresholds related to, for example, channel quality and/or transmit and/or receive beam widths in determining which wireless multiple access scheme should be used for communications in the wireless communication channel.

The selection module 315 may also be configured to transmit the determination of which wireless multiple access scheme will be used for a communication to, for example, a UE 115 or base station 105 of the system 100 in FIG. 1 using the transmitter module 220-a. The determination may be transmitted by, for example, appending a known prefix to a transmission frame, setting a known bit within the transmission frame, etc.

The monitoring module 320 may be configured to monitor one or more characteristics (such as channel quality) corresponding to one or more transmit/receive beam forming direction pairs, and to provide information to the selection module to facilitate continuing to dynamically switching between the wireless multiple access schemes based at least in part on the monitored characteristics.

Figure 4:
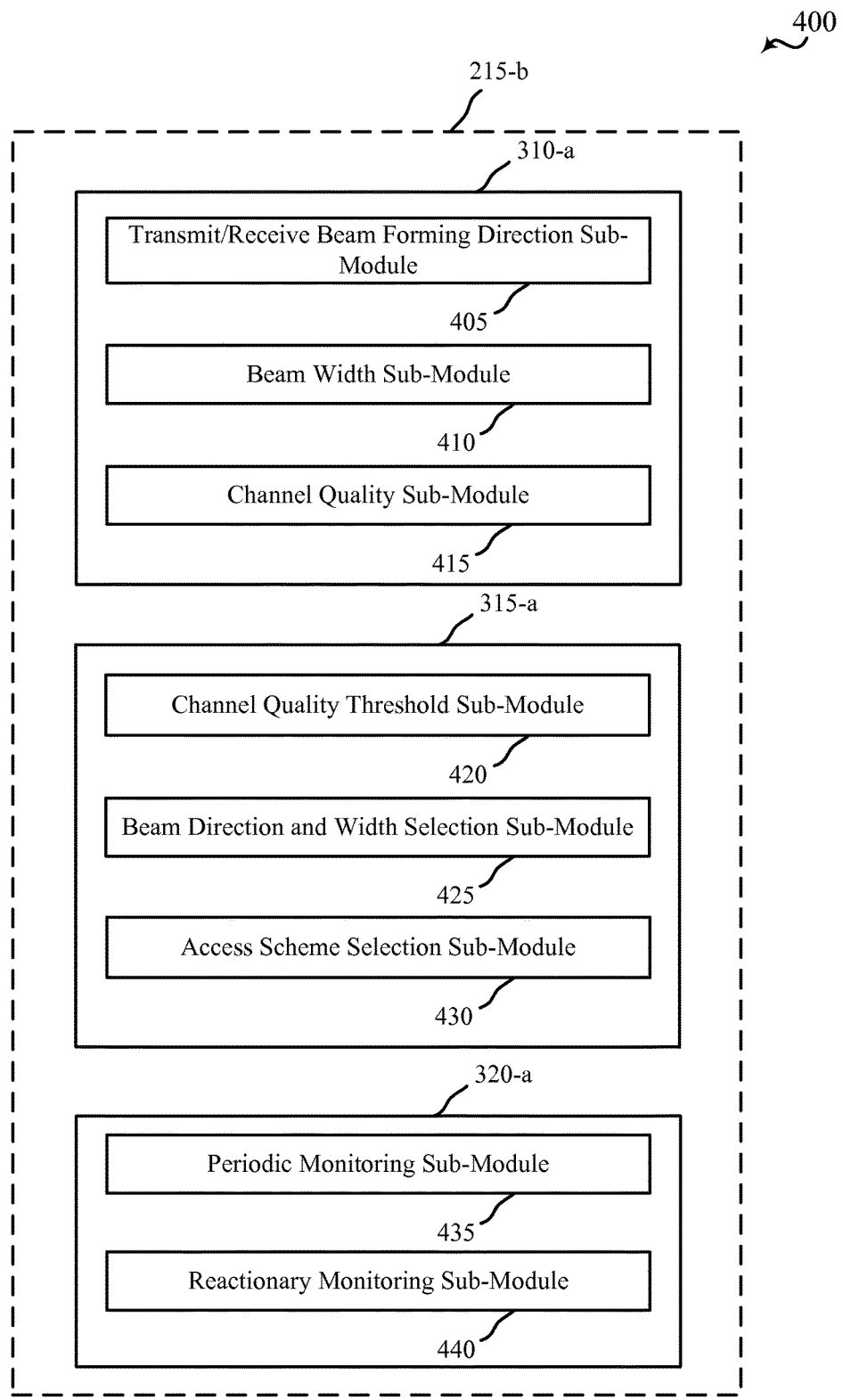
FIG. 4 shows a block diagram of an apparatus for dynamic switching between wireless multiple access schemes in accordance with aspects of the present disclosure.

FIG. 4 shows a block diagram 400 of a switching module 215-b for use in wireless communication in the system 100 of FIG. 1 in accordance with various embodiments. The switching module 215-b may be an example of one or more aspects of the switching modules 215 described with reference to FIGS. 2-3, and may be configured to perform the operations described above with reference to FIGS. 2-3. The switching module 215-b shown in FIG. 4 includes a channel characteristic module 310-a, a selection module 315-a, and a monitoring module 320-a, which may be examples of one or more aspects of the corresponding modules 310, 315, 320 shown in FIG. 3 and may be configured to perform the operations described above with reference to FIG. 3.

The components of the switching module 215-b in FIG. 4 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The channel characteristic module 310-a shown in FIG. 4 further includes a transmit/receive beam forming direction sub-module 405, a beam width sub-module 410, and a channel quality sub-module 415. The transmit/receive beam forming direction sub-module 405 may be configured to receive, determine, store, and/or transmit beam forming weights and/or directions corresponding to one or more transmit/receive beam forming direction pairs (e.g., of one or more candidate beams 140). The beam width sub-module 410 may be configured to receive, determine, store, and/or transmit and/or receive beam widths corresponding to one or more candidate beams and/or transmit/receive beam forming directions. The channel quality sub-module 415 may be configured to receive, determine, store, and/or transmit a channel quality measurement based on a channel quality determination signal received by the channel quality signal measurement module 305 in FIG. 3. As described above, each candidate beam may be defined by a transmit/receive beam forming direction pair, a transmit and/or receive beam width, and/or a channel quality measurement, and, based on these characteristics of each candidate beam (together with which beam is selected for a given communication), a determination may be made by the switching module 215-b regarding which wireless multiple access scheme to use for the communication. As a result, the sub-modules 405, 410, 415 may be configured to receive, determine, store, and/or transmit these or respective characteristics for use in the determination by the switching module (e.g., the selection module 315-a).

In some embodiments, the channel characteristic module 310-a may include all three of the transmit/receive beam forming direction sub-module 405, the beam width sub-module 410, and the channel quality sub-module 415, whereas in other embodiments, the channel characteristic module 310-a may only include one or two of these sub-modules 405, 410, 415. Also, in some embodiments, an apparatus (e.g., apparatus 205, 205-a in FIG. 2 or 3) may not include a channel characteristic module.

The selection module 315-a shown in FIG. 4 includes a channel quality threshold sub-module 420, a beam direction and width selection sub-module 425, and an access scheme selection sub-module 430. The channel quality threshold sub-module 420 may be configured to receive, determine, store, or transmit one or more thresholds that may be used in the determination of whether to use OFDMA or SC-FDMA or another wireless multiple access scheme—for example, if a channel quality characteristic received, determined, stored, or transmitted by the channel quality sub-module 415 is greater or less than a threshold received, determined, stored, or transmitted by the channel quality threshold sub-module 420, a particular wireless multiple access scheme may or may not be used. In some embodiments, the thresholds may be preset and known by each of the transmitter and receiver for a given communication. In other embodiments, the thresholds may be communicated among the transmitter and receiver, including thresholds that may dynamically change during operation (e.g., based on available resources). The beam direction and width selection sub-module 425 may be configured to receive, determine (e.g., select), store, or transmit the transmit and receive beam forming directions and the width of a beam that will be used in communications.

The access scheme selection sub-module 430 may be configured to receive, determine, store, or transmit an indication of which wireless multiple access scheme will be used for a particular communication or group of communications—for example, the access scheme selection sub-module 430 may be configured to determine which wireless multiple access scheme to use based on the transmit/receive beam forming directions, beam width, and channel quality characteristics received, determined, stored, or transmitted by the sub-modules 405, 410, 415 of the channel characteristic module 310 as informed by the thresholds received, determined, stored, or transmitted by the channel quality threshold sub-module, and the transmit/receive beam forming direction and beam width received, determined, stored, or transmitted by the beam direction and width selection sub-module 425.

In some embodiments, the selection module 315-a may include all three of the channel quality threshold sub-module 420, the beam direction and width selection sub-module 425, and the access scheme selection sub-module 430, whereas in other embodiments, the selection module 315-a may only include one or two of these sub-modules 420, 425, 430. Also, in some embodiments, an apparatus (e.g., apparatus 205, 205-a in FIG. 2 or 3) may not include a selection module.

The monitoring module 320-a shown in FIG. 4 includes a periodic monitoring sub-module 435 and a reactionary monitoring sub-module 440. The periodic monitoring sub-module 435 may be configured to periodically monitor one or more characteristics, such as channel quality for one or more candidate or actual beams. The reactionary monitoring module 440 may be configured to cause the apparatus 205 to re-characterize one or more of the candidate or actual beams in reaction to some event, such as a loss of a certain number of packets or the like. In some embodiments, a particular wireless multiple access scheme may be selected for use based on some set of initial conditions, and the periodic and/or reactionary monitoring sub-modules 435, 440 may periodically re-evaluate the candidate beams and characteristics corresponding to various transmit/receive beam forming directions and, based on the re-evaluation, continue to dynamically switch between various wireless multiple access schemes.

In some embodiments, the monitoring module 320-a may include both of the periodic monitoring sub-module 435 and the reactionary monitoring sub-module 440, whereas in other embodiments, the monitoring module 320-a may only include one of the periodic monitoring sub-module 435 or the reactionary monitoring sub-module 440. Also, in some embodiments, an apparatus (e.g., apparatus 205, 205-a in FIG. 2 or 3) may not include a monitoring module.

Figure 5:
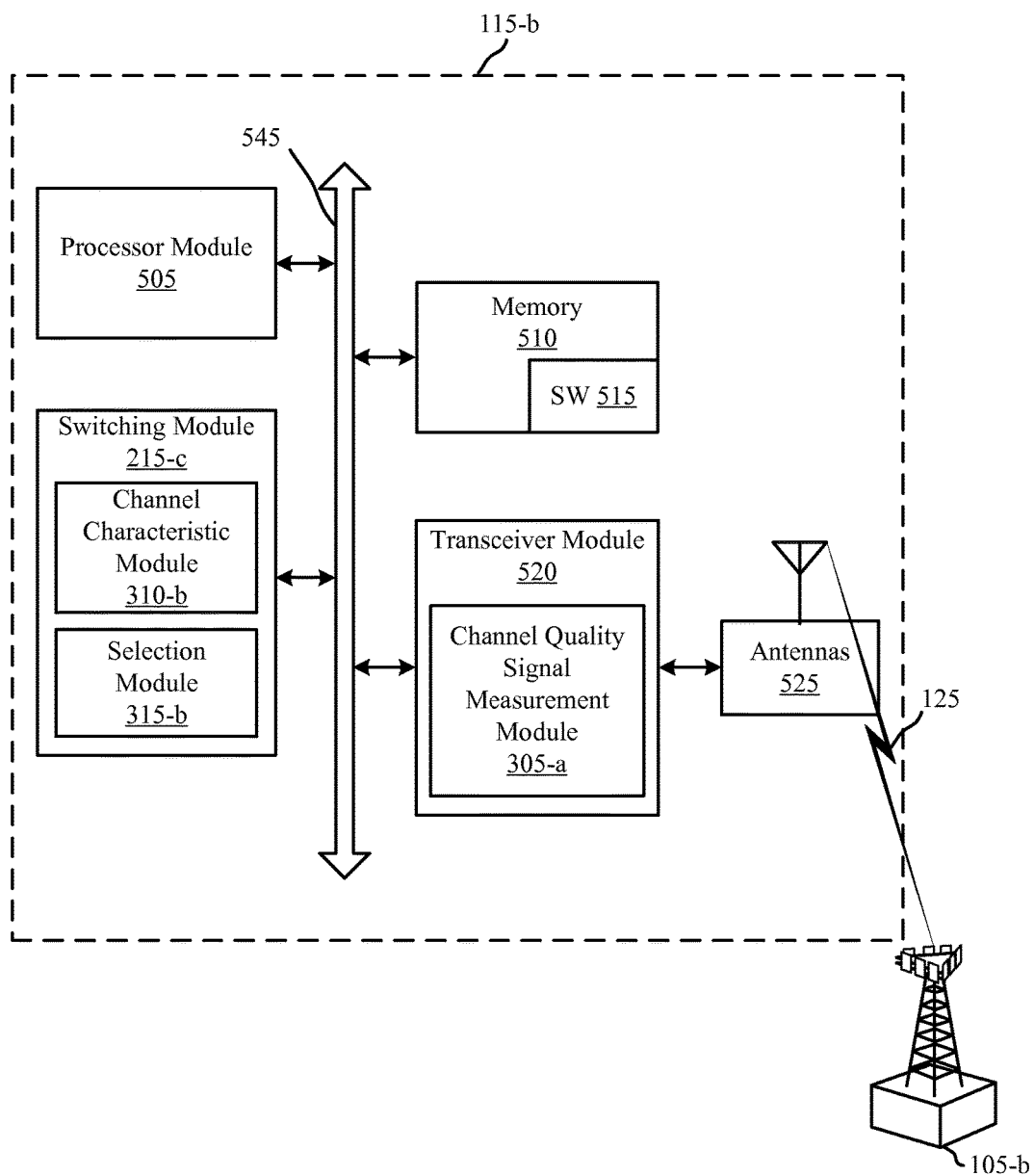
FIG. 5 shows a block diagram of a system for dynamic switching between wireless multiple access schemes in accordance with aspects of the present disclosure.

FIG. 5 shows a diagram of a system 500 for use in wireless communication in accordance with various embodiments. System 500 includes UE 115-b, which may be an example of the UEs 115 in FIG. 1 and/or the apparatuses 205, 205-a in FIGS. 2-3. System 500 also includes a base station 105-b, which may be an example of the base stations 105 in FIG. 1 and/or the apparatuses 205, 205-a in FIGS. 2-3.

The UE 115-b shown in FIG. 5 includes antenna(s) 525, a transceiver module 520, a processor module 505, and memory 510 (including software 515), which each may communicate, directly or indirectly, with each other (e.g., via one or more buses 545). The transceiver module 520 may be configured to communicate bi-directionally, via the antenna(s) 525 and/or one or more wireless communication links, with one or more base stations 105-b, as described above, including by receiving transmissions therefrom. The transceiver module 520 may include a modem configured to modulate the packets and provide the modulated packets to the antenna(s) 525 for transmission, and to demodulate packets received from the antenna(s) 525. While the UE 115-b may include a single antenna 525 in some embodiments, the UE 115-b may alternatively include multiple antennas 525 capable of concurrently transmitting and/or receiving multiple wireless transmissions. The transceiver module 520 may thus be capable of concurrently communicating with one or more base stations 105-b, or with one or more cells of a single base station 105-b.

The memory 510 may include random access memory (RAM) and/or read-only memory (ROM). The memory 510 may store computer-readable, computer-executable software/firmware code 515 containing instructions that are configured to, when executed, cause the processor module 505 to perform various functions described herein (e.g., dynamically switching between using different wireless multiple access schemes). Alternatively, the software/firmware code 515 may not be directly executable by the processor module 505 but be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc. may include random access memory (RAM) and read-only memory (ROM).

The UE 115-b also includes a switching module 215-c, which may be an example of the switching modules 215 shown in FIGS. 2, 3, and 4, and which may be coupled to bus 545 in order to allow communication with the other components of the UE 115-b. The switching module 215-c may include a channel characteristic module 310-b and a selection module 315-b, which may be examples of the channel characteristic and selection modules 310, 315 shown in FIGS. 3 and 4.

Also, as shown in FIG. 5, the transceiver module 520 may include a channel quality signal measurement module 305-a, which may be an example of the channel quality signal measurement module 305 shown in FIG. 3.

Referring still to FIG. 5, the UE 115-b may be configured to receive data from the base station 105-b. As such, the channel quality signal measurement module 305-a may be configured to receive channel quality determination signals from the base station 105-b corresponding to a number of transmit/receive beam forming direction pairs (e.g., for a number of different candidate beams), and to determine a channel quality measurement corresponding to each of the transmit/receive beam forming direction pairs. The channel characteristic module 310-b of the switching module 215-c may be configured to store these characteristics, and the selection module 315-b may be configured to select one of the transmit/receive beam forming direction pairs and candidate transmit and/or receive beam widths for use in a communication and also to select a wireless multiple access scheme to use for that communication from the base station 105-b to the UE 115-b. In other embodiments, however, the UE 115-b may be configured to transmit the channel quality measurements corresponding to the transmit/receive beam forming direction pairs to the base station 105-b, with the base station 105-b determining which wireless multiple access scheme to use for a selected candidate beam transmit/receive beam forming direction pair.

It will be appreciated that while the UE 115-b is shown in FIG. 5 as being a receiver of data transmitted by the base station 105-b, the UE 115-b may also transmit data to the base station 105-b, as described above.

Figure 6:
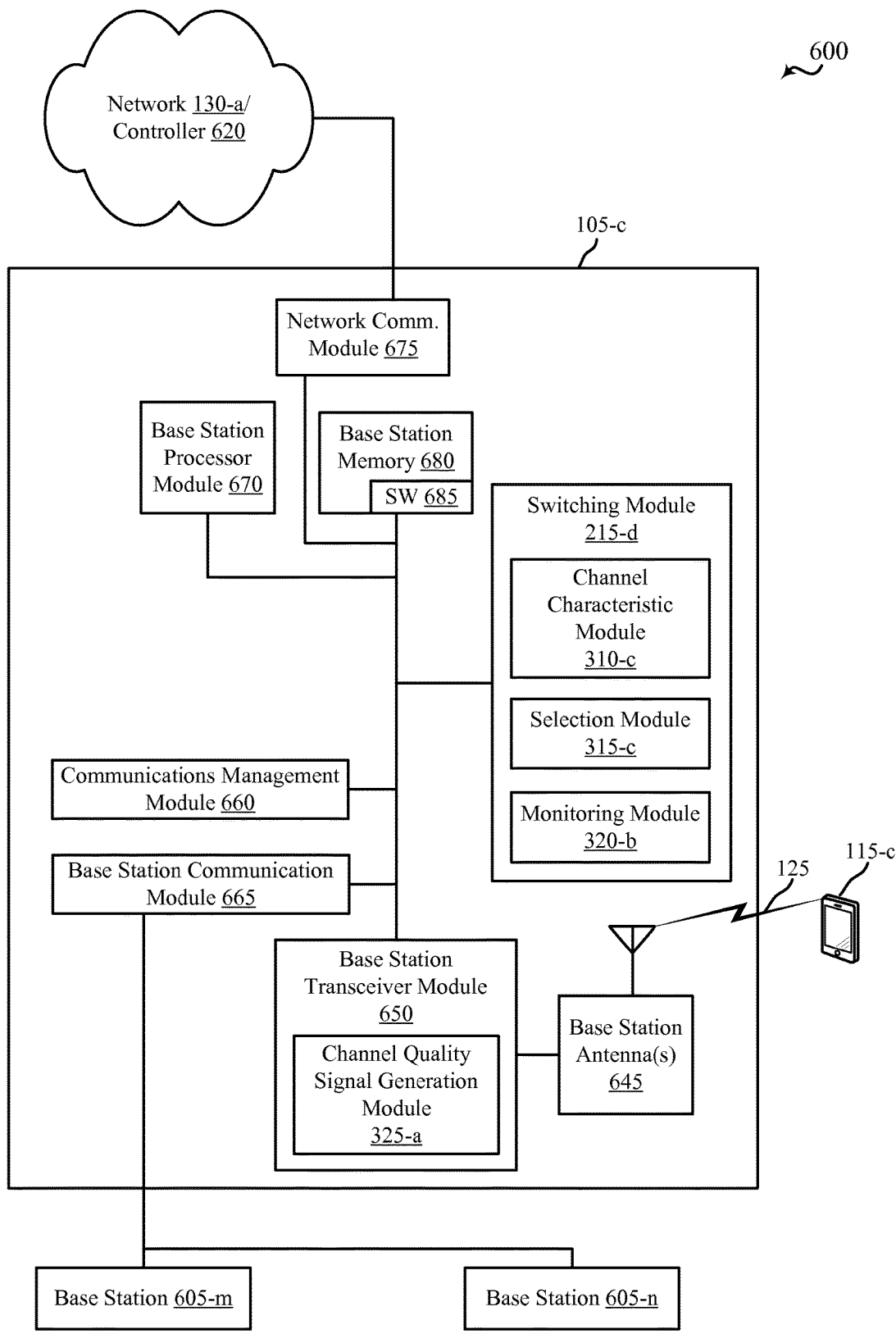
FIG. 6 shows a block diagram of a system for dynamic switching between wireless multiple access schemes in accordance with aspects of the present disclosure.

FIG. 6 shows a diagram of a system 600 for use in wireless communication in accordance with various embodiments. System 600 includes base stations 105-c, 605-m, 605-n, which may be examples of the base stations 105 in FIG. 1 or 5, and/or the apparatuses 205, 205-a in FIGS. 2-3. System 600 also includes a UE 115-c which may be an example of the UEs 115 in FIG. 1 or 5, and/or the apparatuses 205, 205-a in FIGS. 2-3.

The base station 105-c may include antenna(s) 645, a transceiver module 650, memory 680, and a processor module 670, which each may be in communication, directly or indirectly, with each other (e.g., over one or more buses). The transceiver module 650 may be configured to communicate bi-directionally, via the antenna(s) 645, with the UE 115-c, including sending transmissions thereto. The transceiver module 650 (and/or other components of the base station 105-c) may also be configured to communicate bi-directionally with one or more networks. In some cases, the base station 105-d may communicate with the core network 130-a and/or controller 620 through network communications module 675. Base station 105-c may be an example of an eNodeB base station, a Home eNodeB base station, a NodeB base station, and/or a Home NodeB base station. Controller 620 may be integrated into base station 105-c in some cases, such as with an eNodeB base station.

Base station 105-c may also communicate with other base stations 105, such as base station 605-m and base station 605-n. Each of the base stations 105, 605-m 605-n may communicate with one or more UEs using different wireless communications technologies, such as different Radio Access Technologies, with at least some of the communications including beam forming techniques. In some cases, base station 105-c may communicate with other base stations such as 605-m and/or 605-n utilizing base station communication module 665. In some embodiments, base station communication module 665 may provide an X2 interface within an LTE wireless communication technology to provide communication between some of the base stations 105-c, 605-m, 605-n. In some embodiments, base station 105-c may communicate with other base stations through controller 620 and/or core network 130-a.

The memory 680 may include random access memory (RAM) and read-only memory (ROM). The memory 680 may also store computer-readable, computer-executable software code 685 containing instructions that are configured to, when executed, cause the processor module 670 to perform various functions described herein (e.g., dynamically switching between using different wireless multiple access schemes). Alternatively, the software code 685 may not be directly executable by the processor module 670 but may be configured to cause the computer, e.g., when compiled and executed, to perform functions described herein.

The processor module 670 may include an intelligent hardware device, e.g., a central processing unit (CPU), a microcontroller, an application-specific integrated circuit (ASIC), etc. The transceiver module 650 may include a modem configured to modulate the packets and provide the modulated packets to the antenna(s) 645 for transmission, and to demodulate packets received from the antenna(s) 645. While some examples of the base station 105-c may include a single antenna 645, the base station 105-c may alternatively include multiple antennas 645 for multiple links which may support carrier aggregation.

According to the architecture of FIG. 6, the base station 105-c may further include a communications management module 660. The communications management module 660 may manage communications with other base stations 105. By way of example, the communications management module 660 may be a component of the base station 105-c in communication with some or all of the other components of the base station 105-c via a bus. Alternatively, functionality of the communications management module 660 may be implemented as a component of the transceiver module 650, as a computer program product, and/or as one or more controller elements of the processor module 670.

The base station 105-c in FIG. 6 also includes a switching module 215-d, which may be an example of the switching modules 215 shown in FIG. 2, 3, 4 or 5. The switching module 215-d in FIG. 6 may include a channel characteristic module 310-c, a selection module 315-c, and a monitoring module 320. The channel characteristic module 310-c, the selection module 315-c, and the monitoring module 320 in FIG. 6 may have similar functionality as the similar components shown in FIGS. 3 and 4 in some embodiments.

Also, as shown in FIG. 6, the transceiver module 650 may include a channel quality signal generation module 325-a, which may be an example of the channel quality signal generation module 325 shown in FIG. 3.

Referring still to FIG. 6, the base station 105-*c* may be configured to transmit data to the UE 115-*c*. As such, the channel quality signal generation module 325-*a* may be configured to transmit one or more channel quality determination signals corresponding to a number of transmit/receive beam forming direction pairs (e.g., for a number of different candidate beams), and optionally to receive channel quality measurements corresponding to at least some of the transmitted channel quality determination signals. The channel characteristic module 310-*c* of the switching module 215-*d* may be configured to store these characteristics, and the selection module 315-*c* may be configured to select one of the transmit/receive beam forming direction pairs and transmit and/or receive beam widths for use in a communication and also to select a wireless multiple access scheme to use for the communication from the base station 105-*c* to the UE 115-*c*. In other embodiments, however, the UE 115-*c* may determine which wireless multiple access scheme will be used for a particular communication, and the base station 105-*c* may be configured to receive that determination and begin transmitting to the UE 115-*c* accordingly.

It will be appreciated that while the base station 105-*c* is shown in FIG. 6 as being a transmitter of data to the UE 115-*c*, the base station 105-*c* may also receive data transmitted from the UE 115-*c*, as described above.

Figure 7:
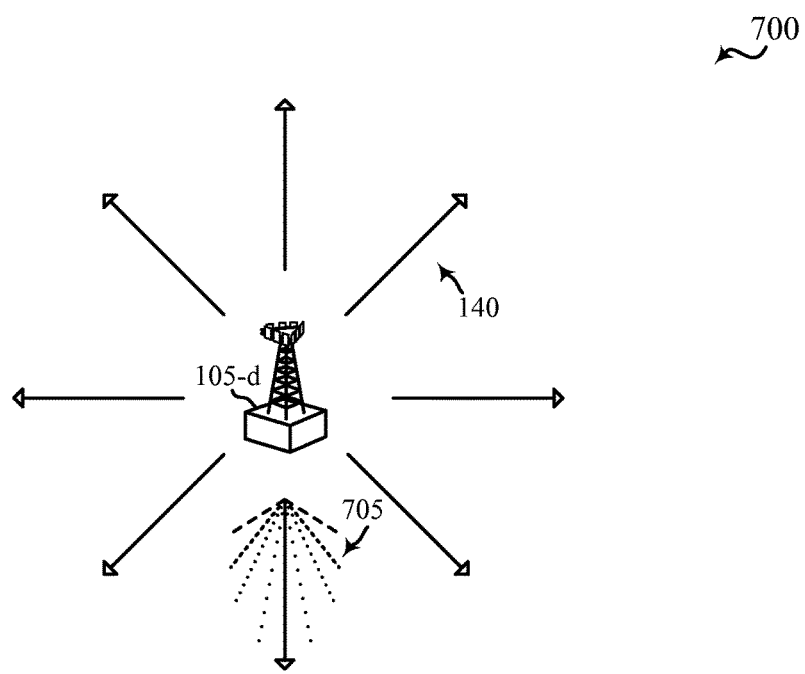
FIG. 7 shows a base station for dynamic switching between wireless multiple access schemes in accordance with aspects of the present disclosure.

FIG. 7 is an illustration 700 of a base station 105-*d* that may dynamically switch between wireless multiple access schemes in accordance with various embodiments. As illustrated in FIG. 7, the base station 105-*d* may transmit data to a receiver (e.g., a UE 115) using one of a number of different candidate beams 140, with each candidate beam having base station transmit and UE receive beam forming directions and being associated with one or more transmit and/or receive beam widths 705.

Figure 8:
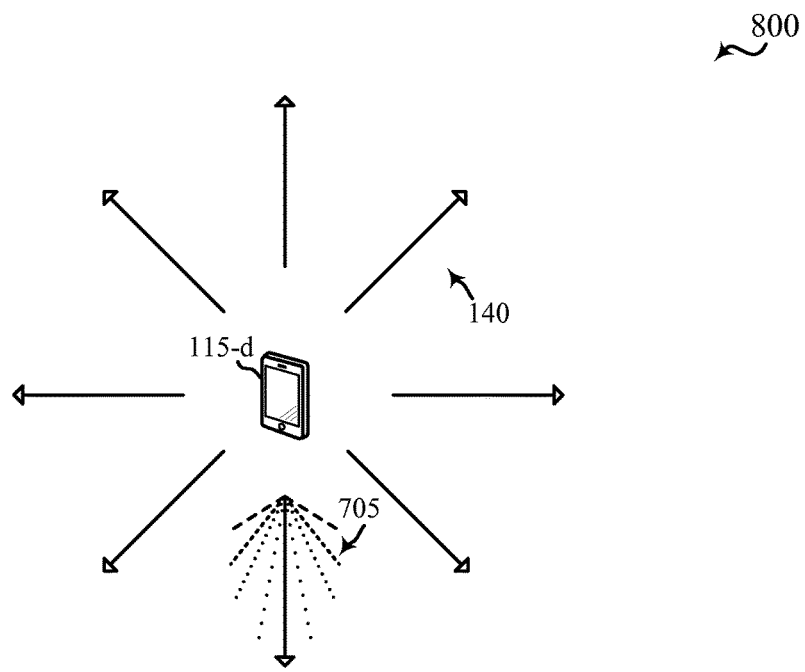
FIG. 8 shows a user equipment (UE) for dynamic switching between wireless multiple access schemes in accordance with aspects of the present disclosure.

Similarly, FIG. 8 is an illustration 800 of a UE 115-*d* that may dynamically switch between wireless multiple access schemes in accordance with various embodiments. As illustrated in FIG. 8, the UE 115-*d* may transmit data to a receiver (e.g., a base station 105) using one of a number of different candidate beams 140, with each candidate beam having respective UE transmit/base station receive beam forming directions and being associated with one or more transmit and/or receive beam widths 705. Regardless of whether a base station 105-*d* or a UE 115-*d* is the transmitter for a given communication, the techniques described herein may be used to dynamically switch between various wireless multiple access schemes based on identified characteristics corresponding to a candidate beam in a given combination of transmit and/or receive beam forming directions with a given combination of transmit and/or receive beam widths.

Figure 9:
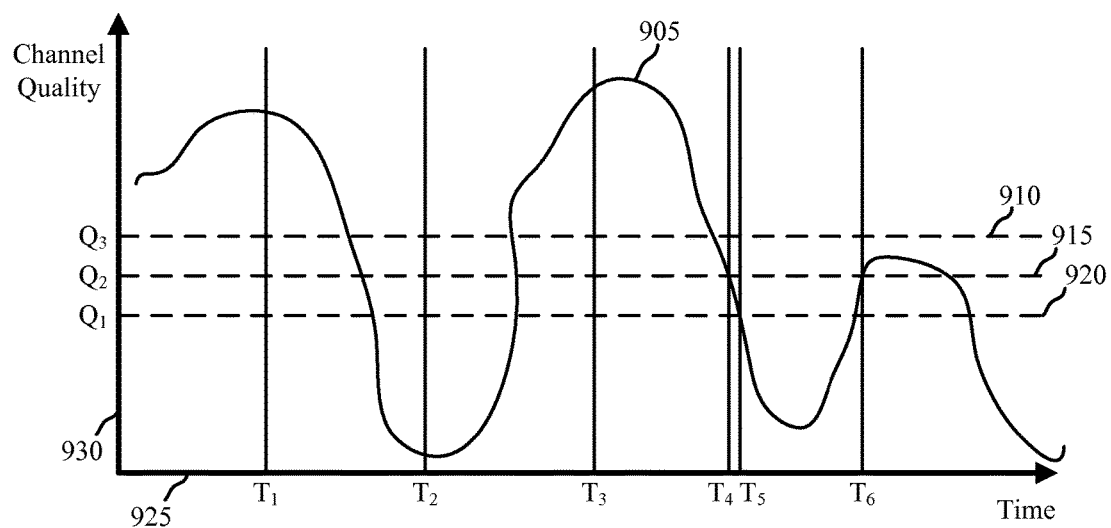
FIG. 9 is a timing diagram illustrating dynamic switching between wireless multiple access schemes in accordance with aspects of the present disclosure.

Turning now to FIG. 9, a timing diagram 900 is shown illustrating the dynamic switching between wireless multiple access schemes in accordance with various embodiments. As described above with reference to FIGS. 3 and 4, a monitoring module 320 may, in some embodiments, monitor a channel characteristic, such as channel quality, and provide monitoring information to the selection module 315 to use in dynamically switching between wireless multiple access schemes. FIG. 9 thus illustrates how a monitoring module 320 may be used in accordance with some embodiments of the present disclosure to monitor channel quality and, based on the monitored channel quality, dynamically switch between wireless multiple access schemes.

FIG. 9 illustrates a plot 905 of how channel quality may vary over time for a given transmit/receive beam forming direction pair and a given transmit and/or receive beam width, with the x-axis 925 of the diagram 900 representing time and the y-axis 930 representing some measure of channel quality, such as signal strength. In FIG. 9, SC-FDMA may be used if the channel quality is relative good, whereas OFDMA may be used if the channel quality is relatively bad.

As shown in FIG. 9, there may be one or more thresholds 910, 915, 920 of channel quality that may be used by the channel quality threshold sub-module 420 of the selection module 315 to determine when a currently in-use wireless multiple access scheme should be dynamically switched to another wireless multiple access scheme—i.e., that define what is "relatively" good or "relatively" bad in terms of channel quality. In some embodiments, there may be multiple thresholds that may implement some form of hysteresis in either time or magnitude in the dynamic switching between wireless multiple access schemes. For example, FIG. 9 shows a magnitude-based hysteresis, where SC-FDMA is used until the channel quality falls below the $Q_1$ threshold 920, and OFDMA is used until the channel quality exceeds the $Q_3$ threshold 910, with the $Q_2$ threshold 915 only being used in the initial determination of which wireless multiple access scheme should be used. Alternatively, however, a time-based hysteresis may be used by which the channel quality would need to be below a quality threshold for a predetermined amount of time before the transmitter would switch to using OFDMA, and similarly, the channel quality would need to exceed a quality threshold for a predetermined amount of time before the transmitted would switch to using SC-FDMA.

Turning now to the specific example plot 905 in FIG. 9, at time $T_1$, the channel quality is relatively good because it is above the $Q_3$ threshold 910, and, as such, SC-FDMA may be used for communications. At time $T_2$, however, channel quality has fallen below the $Q_1$ threshold 920, and, as such, OFDMA may be used for communications. At time $T_3$, the channel quality again has improved and thus SC-FDMA is used again. At time $T_4$, the channel quality falls below the $Q_2$ threshold 915, but the wireless multiple access scheme used may not change to OFDMA until the channel quality falls below the $Q_1$ threshold 920 at time $T_5$. Also, at time $T_6$, despite the channel quality improving somewhat, because it does not exceed the $Q_3$ threshold 910, the wireless multiple access scheme used for communications does not switch to SC-FDMA but instead remains in OFDMA.

It will be appreciated that the plot 905 in FIG. 9 is merely one example of how one channel characteristic (i.e., channel quality) may vary over time, and how the wireless multiple access scheme used for communications may dynamically change over time as the channel characteristic varies over time.

Figure 10:
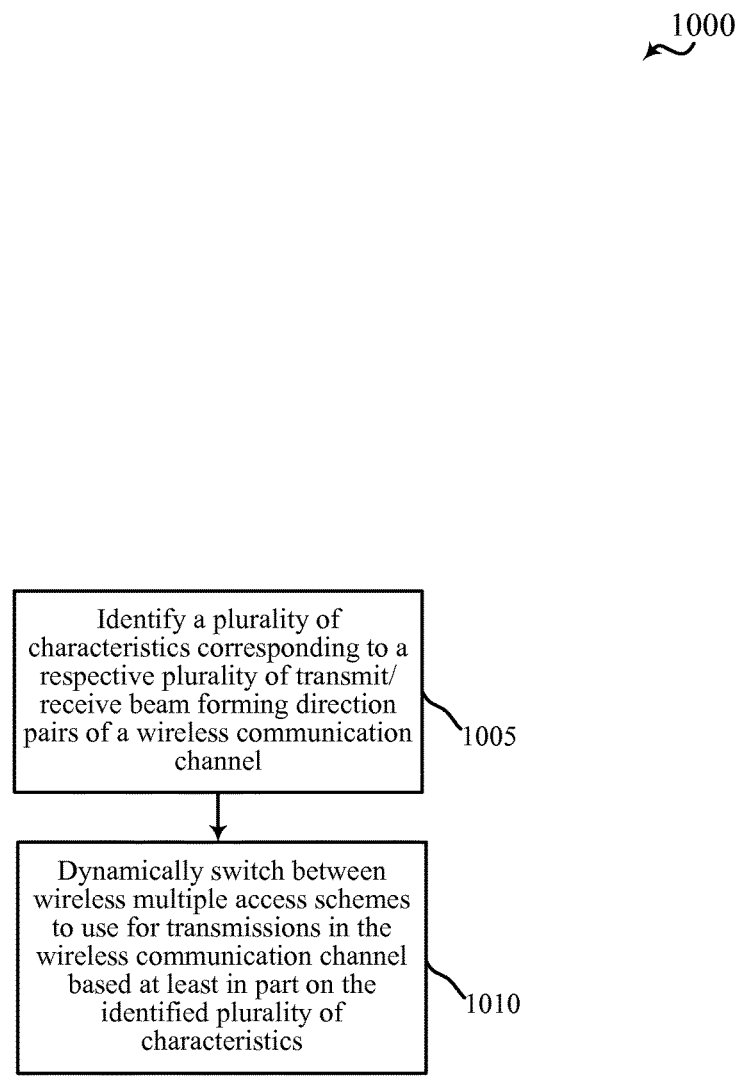
FIG. 10 is a flowchart of a method for dynamically switching between wireless multiple access schemes in accordance with aspects of the present disclosure.

FIG. 10 shows a flowchart 1000 illustrating a method of dynamically switching between wireless multiple access schemes for wireless communication in accordance with various embodiments. The functions of flowchart 1000 may be implemented by a base station 105 or its components, a UE 115 or its components, or an apparatus 205 or its components, as described above with reference to FIGS. 1-4.

At block 1005, a plurality of characteristics corresponding to a respective plurality of transmit/receive beam forming direction pairs of a wireless communication channel may be received. In one example, the characteristics may be received by a receiver module 210 of a base station from a UE 115 after the base station 105 transmits a plurality of channel quality determination signals to the UE in a plurality of transmit/receive beam forming direction pairs.

At block 1010, the wireless multiple access scheme used for communication in the wireless communication channel may dynamically switch (i.e., change) based at least in part on the identified plurality of characteristics. In one embodiment, the determination of which wireless multiple access scheme to use (i.e., whether a current wireless multiple access scheme continues to be used or a new wireless multiple access scheme is used) may be carried out by the switching module 215, including for example the selection module 315.

It should be noted that the method of flowchart 1000 is just one implementation of the operations of the method, and that the steps may be rearranged or otherwise modified such that other implementations are possible.

Figure 11:
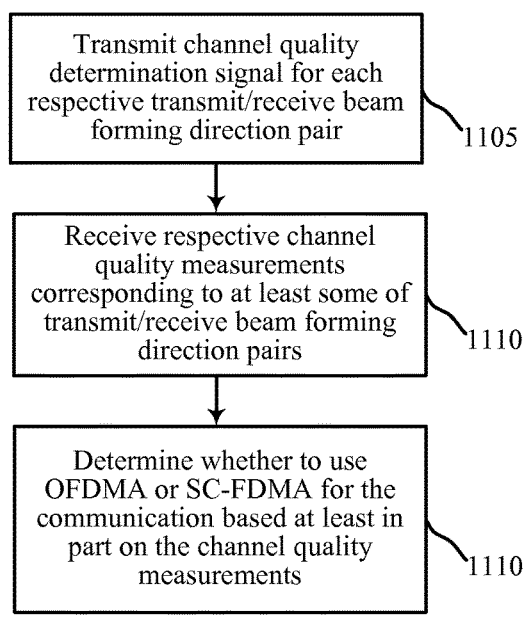
FIG. 11 is a flowchart of a method for dynamically switching between wireless multiple access schemes in accordance with aspects of the present disclosure.

FIG. 11 shows a flowchart 1100 illustrating a method of dynamically switching between wireless multiple access schemes for wireless communication in accordance with various embodiments. The functions of flowchart 1100 may be implemented by a base station 105 or its components, a UE 115 or its components, or an apparatus 205 or its components, as described above with reference to FIGS. 1-4. Generally speaking, the method illustrated in the flowchart 1100 of FIG. 11 may be carried out by a transmitter that may be used to transmit data to a receiver.

At block 1105, channel quality determination signals may be transmitted for each of a plurality of respective transmit/receive beam forming direction pairs. Block 1105 may be carried out by, for example, the channel quality signal generation module 325. At block 1110, respective channel quality measurements corresponding to at least some of the transmit/receive beam forming direction pairs may be received by, for example, the receiver module 210 of the transmitter.

At block 1115, a determination may be made whether to use OFDMA or SC-FDMA (or another wireless multiple access scheme) based at least in part on the received channel quality measurements. In one embodiment, the determination of which wireless multiple access scheme to use (i.e., whether a current wireless multiple access scheme continues to be used or a new wireless multiple access scheme is used) may be carried out by the switching module 215, including for example the selection module 315.

It should be noted that the method of flowchart 1100 is just one implementation of the operations of the method, and that the steps may be rearranged or otherwise modified such that other implementations are possible.

Figure 12:
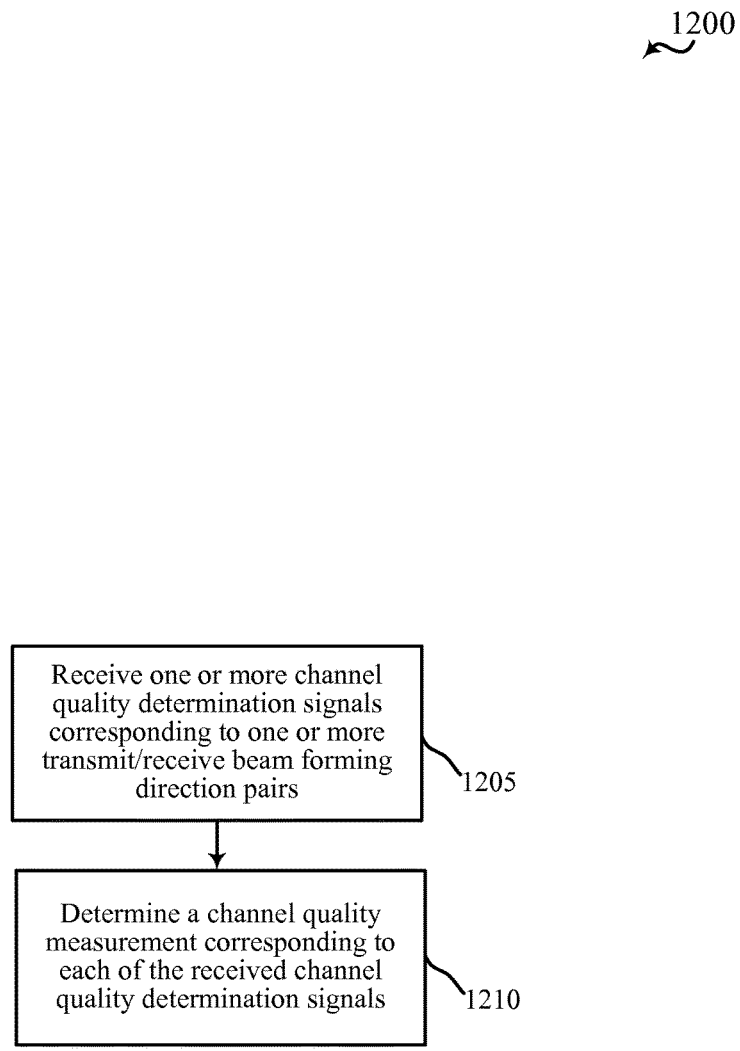
FIG. 12 is a flowchart of a method for dynamically switching between wireless multiple access schemes in accordance with aspects of the present disclosure.

FIG. 12 shows a flowchart 1200 illustrating a method of dynamically switching between wireless multiple access schemes for wireless communication in accordance with various embodiments. The functions of flowchart 1200 may be implemented by a base station 105 or its components, a UE 115 or its components, or an apparatus 205 or its components, as described above with reference to FIGS. 1-4. Generally speaking, the method illustrated in the flowchart 1200 in FIG. 12 may be carried out by a receiver that may be used to receive data from a transmitter.

At block 1205, one or more channel quality determination signals corresponding to one or more transmit/receive beam forming direction pairs may be received. At block 1210, a channel quality measurement corresponding to each of the received channel quality determination signals may be determined Blocks 1205 and 1210 may be carried out by, for example, the channel quality signal measurement module 305

It should be noted that the method of flowchart 1200 is just one implementation of the operations of the method, and that the steps may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
identifying a plurality of characteristics corresponding to a respective plurality of transmit/receive beam forming direction pairs of a wireless communication channel, wherein at least one characteristic comprises a transmit or receive beam width; and
dynamically switching between wireless multiple access schemes to use for communication in the wireless communication channel based at least in part on the identified plurality of characteristics, the wireless multiple access schemes comprising orthogonal frequency division multiple access (OFDMA) and single-carrier frequency division multiple access (SC-FDMA).

2. The method of claim 1, further comprising:
determining which wireless multiple access scheme to use based at least in part on a respective characteristic corresponding to a transmit/receive beam forming direction pair of the plurality of transmit/receive beam forming direction pairs that is selected for the communication.

3. The method of claim 1, further comprising:
transmitting a respective channel quality determination signal for one or more of the plurality of transmit/receive beam forming direction pairs using varying transmit and/or receive beam widths to determine which wireless multiple access scheme to use for the communication.

4. The method of claim 1, further comprising:
determining whether to use OFDMA or SC-FDMA for the communication based at least in part on whether the characteristic corresponding to the one transmit/receive beam forming direction pair is greater than or less than a predetermined threshold.

5. The method of claim 1, further comprising:
transmitting a channel quality determination signal for each respective one of the plurality of transmit/receive beam forming direction pairs;
receiving a respective channel quality measurement corresponding to at least some of the plurality of transmit/receive beam forming direction pairs; and
determining whether to use OFDMA or SC-FDMA for the communication based at least in part on the received channel quality measurements.

6. The method of claim 5, further comprising:
transmitting the channel quality determination signals contemporaneously using a plurality of different frequencies or at different times using a similar frequency.

7. The method of claim 5, wherein the channel quality measurement is one or more of signal strength, signal to interference plus noise ratio (SINK), packet error rate, delay spread, or number of echoes observed at a user equipment (UE).

8. The method of claim 5, further comprising:
transmitting an indication of whether OFDMA or SC-FDMA will be used for the communication.

9. The method of claim 5, further comprising:
monitoring the plurality of characteristics; and
continuing to dynamically switch between the wireless multiple access schemes based at least in part on the monitored characteristics.

10. The method of claim 1, further comprising:
receiving one or more channel quality determination signals corresponding to one or more of the plurality of transmit/receive beam forming direction pairs; and
determining a channel quality measurement corresponding to each of the one or more of the plurality of transmit/receive beam forming direction pairs, the channel quality measurement based at least in part on the respective channel quality determination signal.

11. The method of claim 10, further comprising:
transmitting the determined channel quality measurements.

12. The method of claim 10, further comprising:
determining whether to use OFDMA or SC-FDMA for the communication in the wireless communication channel based at least in part on the determined channel quality measurements.

13. The method of claim 1, further comprising:
transmitting a channel quality determination signal for each of the plurality of transmit/receive beam forming direction pairs;
receiving the plurality of characteristics of the wireless communication channel, each of the plurality of characteristics comprising a respective channel quality measurement based at least in part on the transmitted channel quality determination signals; and
determining whether to use OFDMA or SC-FDMA for the communication based at least in part on the received plurality of characteristics.

14. The method of claim 1, wherein the wireless communication channel is a millimeter wavelength radio frequency channel.

15. The method of claim 1, wherein a transmitter receives the plurality of characteristics and determines whether to use OFDMA or SC-FDMA for the communication in the wireless communication channel.

16. The method of claim 1, wherein each of the plurality of transmit/receive beam forming direction pairs comprises a transmit beam forming direction relative to an orientation of a transmitter in which a beam formed signal propagates from the transmitter and also a receive beam forming direction relative to an orientation of a receiver in which the beam formed signal is received.

17. An apparatus for wireless communication, comprising:
means for identifying a plurality of characteristics corresponding to a respective plurality of transmit/receive beam forming direction pairs of a wireless communication channel, wherein at least one characteristic comprises a transmit or receive beam width; and
means for dynamically switching between wireless multiple access schemes to use for a communication in the wireless communication channel based at least in part on the identified plurality of characteristics, the wireless multiple access schemes comprising orthogonal frequency division multiple access (OFDMA) and single-carrier frequency division multiple access (SC-FDMA).

18. The apparatus of claim 17, further comprising:
means for determining which wireless multiple access scheme to use based at least in part on a respective characteristic corresponding to a transmit/receive beam forming direction pair of the plurality of transmit/receive beam forming direction pairs that is selected for the communication.

19. The apparatus of claim 17, further comprising:
means for transmitting a channel quality determination signal for each respective one of the plurality of transmit/receive beam forming direction pairs;
means for receiving a respective channel quality measurement corresponding to at least some of the plurality of transmit/receive beam forming direction pairs; and
means determining whether to use OFDMA or SC-FDMA for the communication based at least in part on the received channel quality measurements.

20. The apparatus of claim 19, wherein the channel quality measurement is one or more of signal strength, signal to interference plus noise ratio (SINK), packet error rate, delay spread, or number of echoes observed at a user equipment (UE).

21. The apparatus of claim 19, further comprising:
means for monitoring the plurality of characteristics; and
means for continuing to dynamically switch between the wireless multiple access schemes based at least in part on the monitored characteristics.

22. The apparatus of claim 17, further comprising:
means for receiving one or more channel quality determination signals corresponding to one or more of the plurality of transmit/receive beam forming direction pairs; and
means for determining a channel quality measurement corresponding to each of the one or more of the plurality of transmit/receive beam forming direction pairs, the channel quality measurement based at least in part on the respective channel quality determination signal.

23. The apparatus of claim 22, further comprising:
means for determining whether to use OFDMA or SC-FDMA for the communication in the wireless communication channel based at least in part on the determined channel quality measurements.

24. The apparatus of claim 17, wherein the wireless communication channel is a millimeter wavelength radio frequency channel.

25. An apparatus for wireless communication, comprising:
a processor;
memory in electronic communication with the processor; and
instructions stored in the memory, the instructions being executable by the processor to:
identify a plurality of characteristics corresponding to a respective plurality of transmit/receive beam forming direction pairs of a wireless communication channel, wherein at least one characteristic comprises a transmit or receive beam width; and
dynamically switch between wireless multiple access schemes to use for a communication in the wireless communication channel based at least in part on the identified plurality of characteristics, the wireless multiple access schemes comprising orthogonal frequency division multiple access (OFDMA) and single-carrier frequency division multiple access (SC-FDMA).

26. The apparatus of claim 25, wherein the memory further comprises instructions being executable by the processor to:
transmit a channel quality determination signal for each respective one of the plurality of transmit/receive beam forming direction pairs;
receive a respective channel quality measurement corresponding to at least some of the plurality of transmit/receive beam forming direction pairs; and
determine whether to use OFDMA or SC-FDMA for the communication based at least in part on the received channel quality measurements.

27. The apparatus of claim 26, wherein the memory further comprises instructions being executable by the processor to:
monitor the plurality of characteristics; and
continue to dynamically switch between the wireless multiple access schemes based at least in part on the monitored characteristics.

28. The apparatus of claim 25, wherein the memory further comprises instructions being executable by the processor to:
- receive one or more channel quality determination signals corresponding to one or more of the plurality of transmit/receive beam forming direction pairs; and
- determine a channel quality measurement corresponding to each of the one or more of the plurality of transmit/receive beam forming direction pairs, the channel quality measurement based at least in part on the respective channel quality determination signal.

29. A non-transitory computer-readable medium for wireless communication in a wireless device, the non-transitory computer-readable medium storing computer-executable code for:
- identifying a plurality of characteristics corresponding to a respective plurality of transmit/receive beam forming direction pairs of a wireless communication channel, wherein at least one characteristic comprises a transmit or receive beam width; and
- dynamically switching between wireless multiple access schemes to use for a communication in the wireless communication channel based at least in part on the identified plurality of characteristics, the wireless multiple access schemes comprising orthogonal frequency division multiple access (OFDMA) and single-carrier frequency division multiple access (SC-FDMA).

* * * * *